(12) United States Patent
Gartrell et al.

(10) Patent No.: US 8,934,219 B2
(45) Date of Patent: Jan. 13, 2015

(54) ELECTRONIC APPARATUS WITH A DETACHABLE DISPLAY

(75) Inventors: Andrew Gartrell, Woodland Hills, CA (US); Duncan Burns, Santa Monica, CA (US)

(73) Assignee: Nokia Corporation, Espoo (FI)

( * ) Notice: Subject to any disclaimer, the term of this patent is extended or adjusted under 35 U.S.C. 154(b) by 482 days.

(21) Appl. No.: 13/070,987

(22) Filed: Mar. 24, 2011

(65) Prior Publication Data

US 2012/0243149 A1    Sep. 27, 2012

(51) Int. Cl.
*H05K 5/00* (2006.01)
*H05K 7/00* (2006.01)
*A47G 1/10* (2006.01)
*E04G 3/00* (2006.01)
*E05C 5/02* (2006.01)
*G06F 1/16* (2006.01)

(52) U.S. Cl.
CPC .......... *G06F 1/1616* (2013.01); *G06F 1/1654* (2013.01); *G06F 1/1679* (2013.01)
USPC .......... 361/679.01; 361/679.44; 361/679.39; 361/679.45; 361/679.58; 248/316.5; 248/292.14; 248/229.22; 292/8; 292/4; 292/341.17

(58) Field of Classification Search
CPC ................ H05K 5/0026; H05K 5/026; H05K 2201/10159
USPC ........................ 361/679.02, 679.08, 679.3, 361/679.55–679.59, 679.01–679.09, 361/679.1–679.19, 679.21–679.29, 361/679.31–679.45, 679.55–679.6, 361/724–747; 345/156, 157, 168, 169; 248/80–88, 155.1–155.5, 166–173, 248/180.1–186.2, 229.1–231.51, 271.4, 248/292.14, 316.1–316.8; 292/1–62, 113, 292/169.11–169.23, 341.11–341.19; 369/75.1, 75.2, 75.11, 75.21, 76, 369/77.11, 77.21, 78, 79, 80, 81, 82
See application file for complete search history.

(56) References Cited

U.S. PATENT DOCUMENTS 5,196,993 A    3/1993   Herron et al.
6,304,431 B1   10/2001  Kim (Continued)

FOREIGN PATENT DOCUMENTS

EP         2190171 A1    5/2010

OTHER PUBLICATIONS

International Search Report of International Application No. PCT/FI2012/050289—Date of Completion of Search: Jul. 9, 2012, 6 pages.

(Continued)

*Primary Examiner* — Jerry Wu
(74) *Attorney, Agent, or Firm* — Locke Lord LLLP

(57) ABSTRACT

An apparatus with a base part and a display part, which is detachable from the base part. There is a cavity formed in the base part and the apparatus is configured to have at least a closed configuration and an open configuration. In the closed configuration, the display part is configured to cover the base part, and in the open configuration, the cavity is configured to receive and hold the display part in an upright tilted position in relation to the base part.

18 Claims, 10 Drawing Sheets

(56) References Cited

U.S. PATENT DOCUMENTS

| | | | |
|---|---|---|---|
| 6,317,315 B1 * | 11/2001 | Lee et al. | 361/679.29 |
| 6,903,927 B2 * | 6/2005 | Anlauff | 361/679.28 |
| 6,952,340 B2 * | 10/2005 | Son et al. | 361/679.09 |
| 2005/0057516 A1 | 3/2005 | Ghosh et al. | |
| 2005/0207104 A1 | 9/2005 | Love | |
| 2007/0133156 A1 * | 6/2007 | Ligtenberg et al. | 361/681 |
| 2010/0033916 A1 | 2/2010 | Douglas et al. | |
| 2010/0222110 A1 | 9/2010 | Kim et al. | |
| 2010/0238620 A1 * | 9/2010 | Fish | 361/679.09 |
| 2011/0292584 A1 * | 12/2011 | Hung et al. | 361/679.26 |

OTHER PUBLICATIONS

"Laptop innovation flop: Detachable displays", downloaded Feb. 27, 2011, (http://www.techrepublic.com/photos/laptop-innovation-flop-detachable-displays/460610), 5 pages.

"Panasonic toughbook permanent display removable computer", downloaded Feb. 27, 2011, (http://www.itechnews.net/2010/07/30/panasonic-toughbook-permanent-display-removable-computer/), 7 pages.

\* cited by examiner

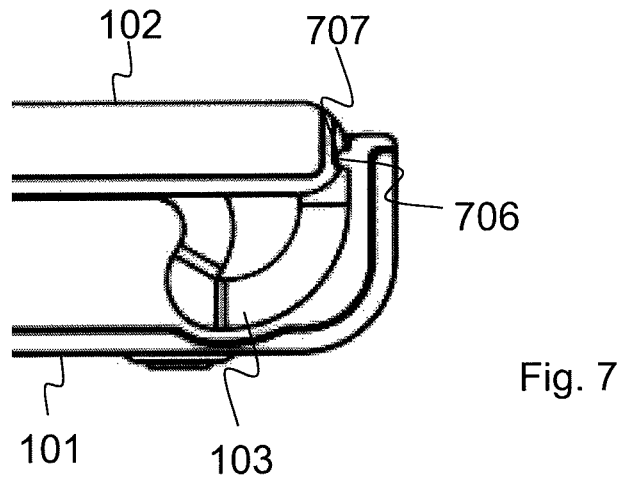
Fig. 7
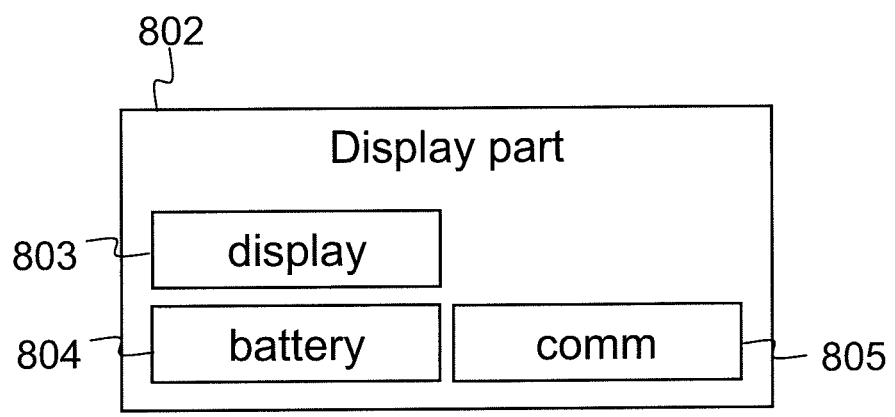
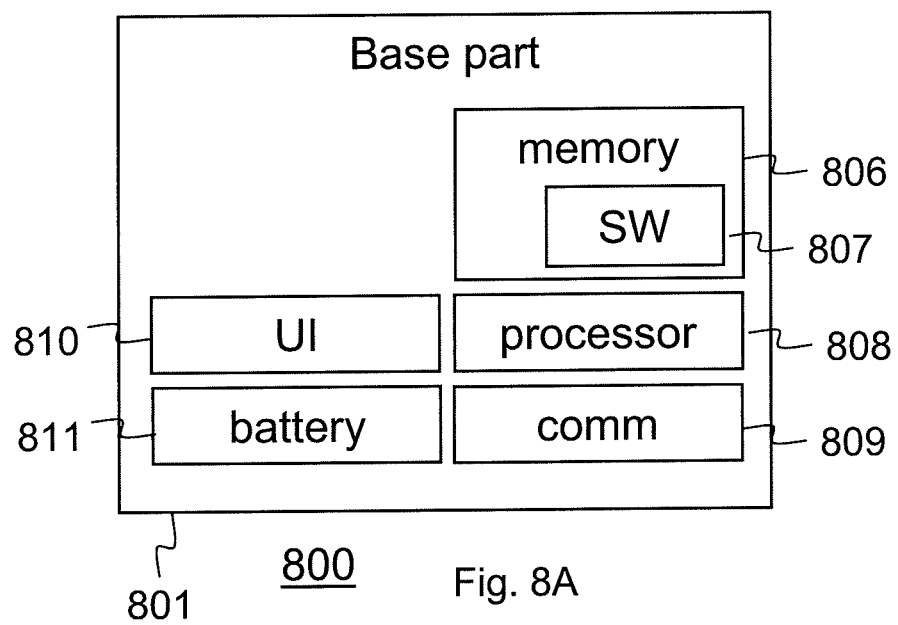
Fig. 8A

ELECTRONIC APPARATUS WITH A DETACHABLE DISPLAY

TECHNICAL FIELD

The present application relates generally to an electronic apparatus comprising a display.

BACKGROUND

The optimal mix of size, weight and functionality of electronic computing devices has not yet been achieved. Various different devices in different sizes and with different functionalities are offered for users.

SUMMARY

Various aspects of examples of the invention are set out in the claims.

According to a first aspect of the invention there is provided an apparatus, comprising:
 a base part,
 a display part, which is detachable from the base part, and
 a cavity formed in the base part, wherein the apparatus is configured to comprise at least a closed configuration and an open configuration, wherein
  in the closed configuration, the display part is configured to cover the base part, and
  in the open configuration, the cavity is configured to receive and hold the display part in an upright tilted position in relation to the base part.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well. Any appropriate combinations of the embodiments may be formed.

BRIEF DESCRIPTION OF THE DRAWINGS

For a more complete understanding of example embodiments of the present invention, reference is now made to the following descriptions taken in connection with the accompanying drawings in which:

FIG. 7 shows a partial cross sectional view of an apparatus according to an embodiment of the invention;

FIG. 8A shows an example block diagram of an apparatus according to an example embodiment of the invention;

DETAILED DESCRIPTION

Figure 1:
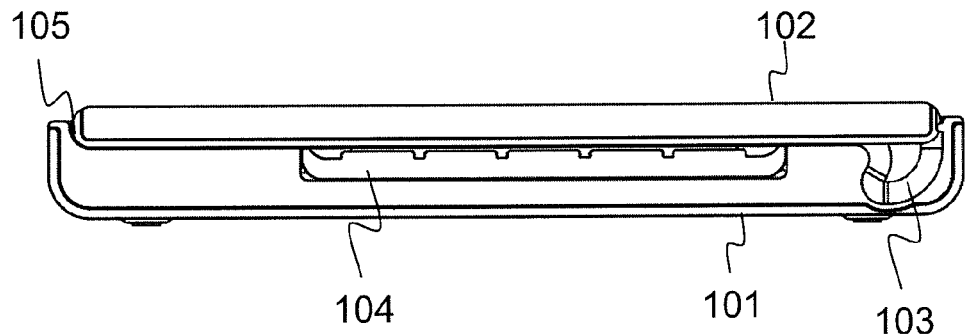
FIGS. 1-4 show a cross sectional view of an apparatus according to an embodiment of the invention.

Example embodiments of the present invention and their potential advantages are understood by referring to FIGS. 1 through 9 of the drawings. In the following description, like numbers denote like elements.

There has been no elegant way to efficiently blend the value offered by laptops at one end, with smart phones on the other. When a person is moving around his/her home in different rooms or resting on a couch while using his/her mobile device, a laptop is often too heavy, uncomfortably overheats, or takes too long to boot-up to simply play a song. Smart phones remain highly personal, yet largely disconnected from surrounding home technology. Tablets offer versatile experiences, but in many cases they need to be supplemented by different accessories such as separate qwerty keyboards, pop-out stands and protective cases.

Now a new versatile two-part apparatus is provided. In various example embodiments, the apparatus adapts to various mobile experiences elegantly, whether it's room hopping/couch surfing/cooking up in the kitchen at home, commuting to work via bike or bus, or sharing media at a party or over coffee. In various example embodiments the apparatus adapts to people's needs in mobile use cases alongside their needs in more stable (or "not so mobile") use cases without having to resort to add-on accessories or multiple extra devices. In mobile use cases people's needs include for example the following: enabling heads-up use, communicating while moving, compact size, glanceable display, and personal use. In stable use cases people's needs include for example the following: heads-down use, at home use, larger screen, social use, seated use, and enabling continuous typing.

In an example embodiment of the invention there is provided a two-part apparatus comprising a base part and a detachable display part. The base part comprises a cavity formed therein and the apparatus is configured to have at least a closed configuration and an open configuration. In further embodiments, the apparatus additionally comprises an intermediate configuration and/or a detached configuration.

In the closed configuration, the display part is configured to cover the base part so that the display part sits on top of the base part. In an example embodiment the base part comprises a recess configured to receive the display part in the closed configuration. In an example embodiment, in the closed configuration the display part sits recessed within the base part. The recessed configuration allows protection for the display part and prevents accidental removal of the display part.

In an example embodiment the display part is reversible and either side of the display part may face the base part in the closed configuration. In an example embodiment, the display part comprises a display on one side of the display part. In an alternative embodiment shown in FIGS. 12 and 13, the display part comprises a display (1206, 1306) on both sides of the display part. One of the displays may be a high contrast full colour OLED (organic light-emitting diode) display or some other advanced display type and the other one may be a low power bi-stable display or some other low end display suitable for displaying for example alerts or simple graphics. The advanced display may be referred to as a main display and the low end display may be referred to as an additional display. In an example embodiment a display of the display part faces upwards and the apparatus effectively behaves as a tablet with extra computing power provided by the base part. In an example embodiment a display of the display part faces the base part whereby the base part provides protection for the display (for example for transport of the apparatus).

In an example embodiment the apparatus comprises at least two operating modes in the closed configuration. In a first operating mode, the apparatus is configured for transport. In this mode there is relatively little or no interaction at all between the user and the apparatus. As an example, the apparatus may be configured to operate in a drift mode, in which the display part may show various ambient alerts. Also simple interactions and responses may be enabled. Such simple interactions and responses include for example simple heads-up interactions that allow people to communicate and consume small bites of content while on the go. Alternatively the apparatus may be configured to operate in a sleep mode or the apparatus may be turned off in the first operating mode. In an example embodiment, in the first operating mode a main display of the display part is folded away so that it faces the base part whereby the base part provides protection for the main display. An additional display may be exposed in the first operating mode.

In a second operating mode, the display part operates as a touch screen. As an example, in this mode the apparatus may be used for simple consumption of casual information, news feeds, navigation, or e-book reading. In an example embodiment, in the second operating mode a main display of the display part is placed on the base part so that the main display is exposed to the user (faces outwards).

In yet another alternative the apparatus is configured to operate in an intermediate mode in the closed configuration. The apparatus behaves for example as a local wifi-hotspot for other nearby devices.

In the open configuration, the cavity in the base part is configured to receive and hold the display part in an upright tilted position in relation to the base part. In an example embodiment the apparatus is used like a regular laptop in the open configuration. This is better suited to in-depth browsing or office-like processing tasks, for example.

In an example embodiment, in the open configuration the cavity in the base part is configured to allow the display part to be detached from the base part for example by lifting the display part up from the base part. That is, the display part can be simply picked up from the base part.

In the intermediate configuration, a gap is formed between one edge of the display part and the base part. In an example embodiment, the gap is formed via a magnetic force. This allows finger access to the display part and thereby enables a user to easily move the display part from the closed configuration to the open configuration. In an example embodiment, the intermediate configuration allows the display part to be detached from the base part for example by lifting the display part up from the base part. That is, the display part can be simply picked up from the base part. In other words, in the intermediate configuration, the display part can be either lifted away from the base part or rolled into the upright open configuration. In this way, immediate removal of the display part from the intermediate configuration without first rolling the display part to the open configuration is possible and may be preferred for example if one is in a hurry or wants to simply invert the display part.

In the detached configuration, the display part is detached from the base part. In an example embodiment, the display part and the base part continue to operate as a single unit despite of being separated. In an example embodiment the apparatus is used for multi-part social computing in the detached configuration. In an example embodiment the base part and the display part are separated but interoperable and the base part can be used to control the display part for example over a LPRF (low power radio frequency) connection. One example of multi-part social computing is sharing pictures. The user retains the base part and uses the base part to control the sharing of the pictures (e.g. the pace of changing the pictures and selecting which pictures to show), while people who are viewing the pictures can gather more intimately around the display part without the user needing to hold up the whole apparatus.

In an example embodiment, the base part and the display part are mechanically separate from each other in the sense that there are no connectors or the like connecting the parts to each other. It must be noted that there may be a wireless connection or other connector-less connection between the base part and the display part, though. In an example embodiment, the base part comprises a processor that provides computing power for the whole apparatus and the display part streams data from base part over an LPRF/wifi or optical connection. It must be noted that also the display part may comprise a processor of its own, though. In an example embodiment the base part comprises a master battery and the display part comprises a separate display battery, that may be charged by the master battery.

In an example embodiment the cavity in the base part is configured to guide movement of the display part, when the display part is moved towards or away from the open configuration. In an example embodiment, there is a friction contact between the cavity and the display part. In an example embodiment, the cavity has a curved form for allowing smooth movement of the display part.

In an example embodiment, the apparatus comprises a locking mechanism configured to lock the display part to the base part when the apparatus is in closed configuration. In an embodiment the locking mechanism is a magnetic locking mechanism.

In an example embodiment, the locking mechanism comprises a mechanical magnetic latch or a capacitive touch latch. In an alternative example the locking mechanism is a mechanical locking mechanism, which may be released for example by pushing the display part down towards the base part.

In an example embodiment, the display part is configured to move from the closed configuration to the intermediate configuration in response to release of the locking mechanism. In an example embodiment releasing the locking mechanism modifies a magnetic field between the base part and the display part. In an example there is a fixed magnet in the display part and the modification of the magnetic field is effected by reversing polarity of an electro magnet in the base part or by moving an opposing magnet within the base part into a different position. In an example embodiment the magnetic field is modified such that after the modification the magnetic field in the base part is on opposition to the fixed magnet in the display part. In response to this the display is repulsed, and consequently held slightly open.

In an example embodiment the locking mechanism comprises a capacitive touch zone, which when swiped by a finger, flips a magnetic field in an electro magnet in the base part. The result from a user's perspective is the display part magically popping ajar.

FIGS. 1-4 show a cross sectional view of an apparatus according to an embodiment of the invention.

FIG. 1 shows the apparatus in a closed configuration. The apparatus comprises a base part 101 and a display part 102. The base part 101 comprises a longitudinal cavity 103, a keyboard 104 and a recess 105. The base part 101 and the display part 102 are mechanically separate from each other in the sense that there are no connectors or the like between the display part 102 and the base part 101 and the display part 102 can be detached from the base part 101.

The cavity 103 is formed near one edge of the base part 101.

The recess 105 is configured to receive the display part 102 such that in the closed configuration the display part 102 sits snugly in the recess 105. In an embodiment, the recess 105 is such that the display part 102 is generously submerged below the surrounding frame/structure of the base part 101. In this way it is possible to avoid any extraneous edges of the display part emerging from the base part in the closed configuration. Such extraneous edges may cause accidental catching and possibly unintended opening of the display part and therefore it is beneficial to avoid them.

In an example embodiment, the keyboard 104 comprises a qwerty-keyboard. In an alternative embodiment, the keyboard 104 comprises control keys, e.g. for controlling a music player or providing controls for an electronic game. In an embodiment, the keyboard 104 is a mechanical keyboard comprising mechanical keys. In an alternative embodiment, the keyboard 104 is a touch screen showing a keyboard. In a still further embodiment, the keyboard 104 is a hybrid keyboard comprising mechanical keys and touch screen keys. In yet another embodiment, the keyboard 104 comprises exchangeable configurations for example in the form of exchangeable keymats.

Figure 2:
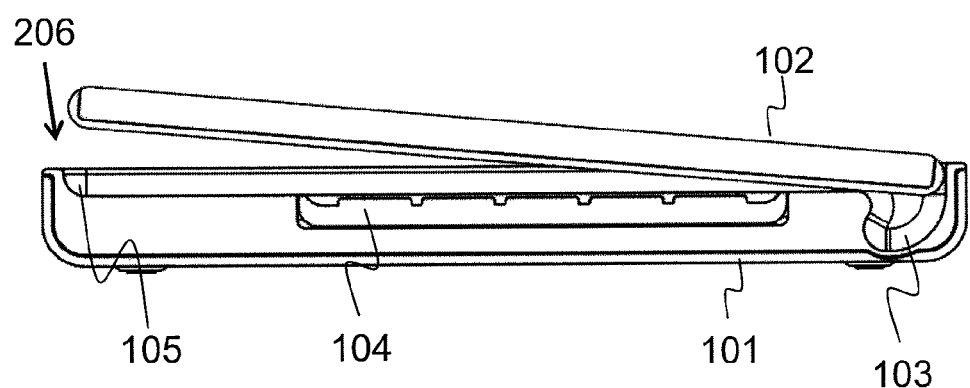

FIG. 2 shows the apparatus of FIG. 1 in an intermediate configuration. In the intermediate configuration a gap 206 is formed between the base part 101 and one edge of the display part 102. In an example embodiment, the cavity 103 is located near one edge of the base part and the gap 206 is formed at an opposite edge of the base part. In other words, the display part 102 is held ajar in relation to the base part 101. This configuration allows finger access to the display part 102 so that the display part 102 can be rolled over to an open configuration shown in FIG. 3. Additionally or alternatively to rolling the display part over to the open configuration, the intermediate configuration allows detaching the display part from the base part. In an example embodiment, the apparatus comprises a magnetic locking mechanism (not shown) that locks the display part 102 to the base part 101 when the apparatus is in closed configuration. When the locking mechanism is released/unlocked the display part 102 pops up slightly into the intermediate configuration.

In an example embodiment the magnetic locking mechanism is configured to provide a repulsive buffer, when the display part is moved from open configuration towards the closed configuration. In this way the magnetic locking mechanism slows down the display part if a user drops the display part down towards the closed configuration.

In an example embodiment, the cavity 103 is located near one edge of the base part and the magnetic locking mechanism is placed near an opposite edge of the base part. In an example embodiment, the magnetic locking mechanism comprises permanent or fixed magnets in the display part 102 and an electro magnet in the base part 101.

Figure 3:
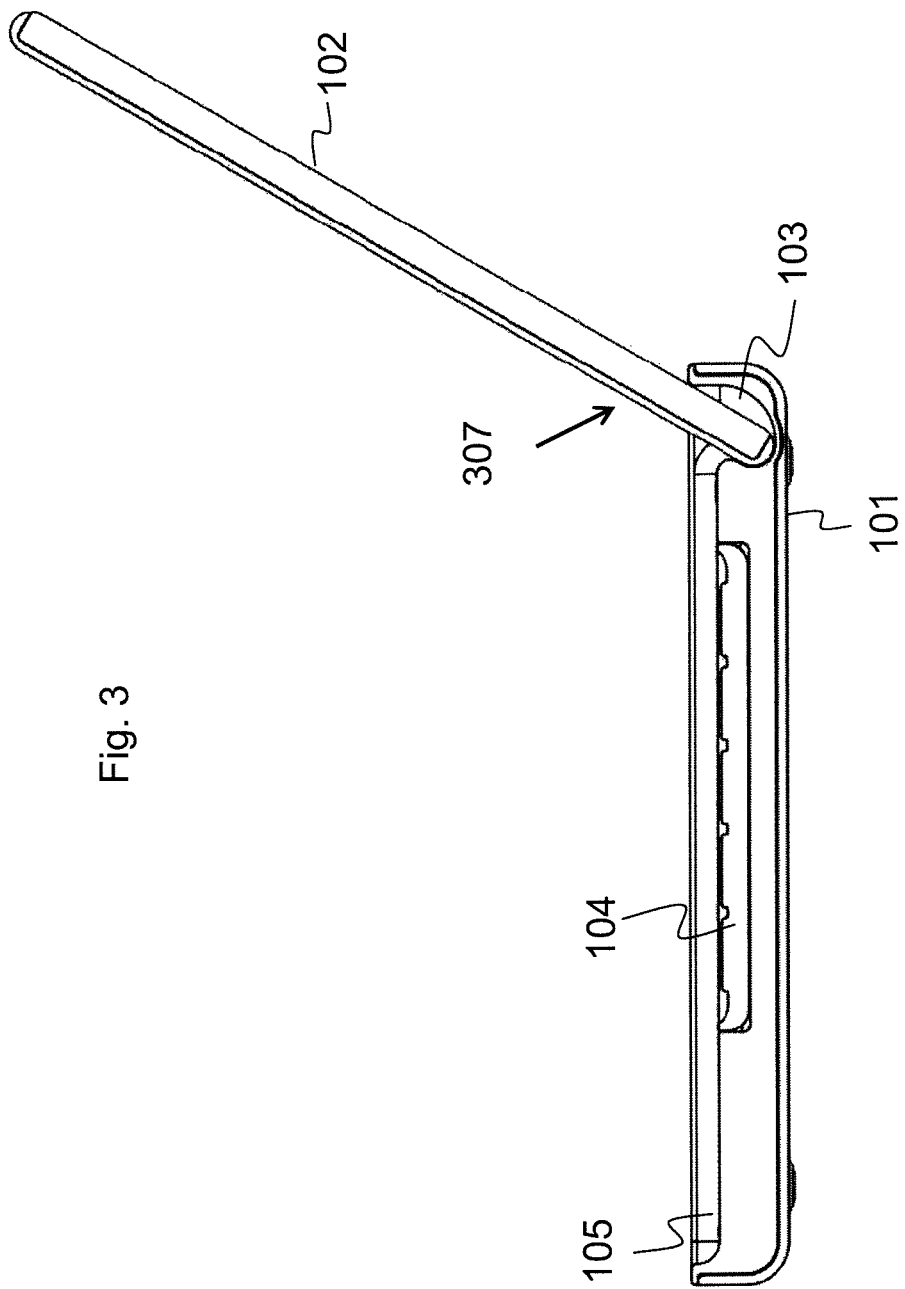

FIG. 3 shows the apparatus of FIG. 1 in an open configuration. The cavity 103 holds the display part 102 in an upright tilted position in relation to the base part 101. Angle 307 between the base part 101 and the display part 102 is over 90 degrees and less than 180 degrees. The cavity 103 is formed such that it allows the display part 102 to be lifted up from the base part 101 in order to fully detach the display part 102 from the base part 101.

In an example embodiment, the display part 102 may be left in the upright position for much longer periods than say a laptop, where people tend to close the display once shutting down. In this way, the design of the apparatus assumes a hybrid role of both static and dynamic object, without the need for additional accessories. When the display part is left open it can be part family bill-board, part media center, part telephony hub, for example. And yet the display part can be detached from the base part just as quickly for a more personal experience, or closed down and popped under your arm when mobility is more important.

In an example embodiment, the geometry of the cavity 103 is such that it holds the display part 102 securely up. In an example embodiment the geometry of the cavity 103 is smoothly curved to guide movement of the display part 102 such that the display part rolls smoothly over to the open configuration when the display part 102 is raised from the edge of the display part 102 that is opposite the cavity 103.

Figure 4:
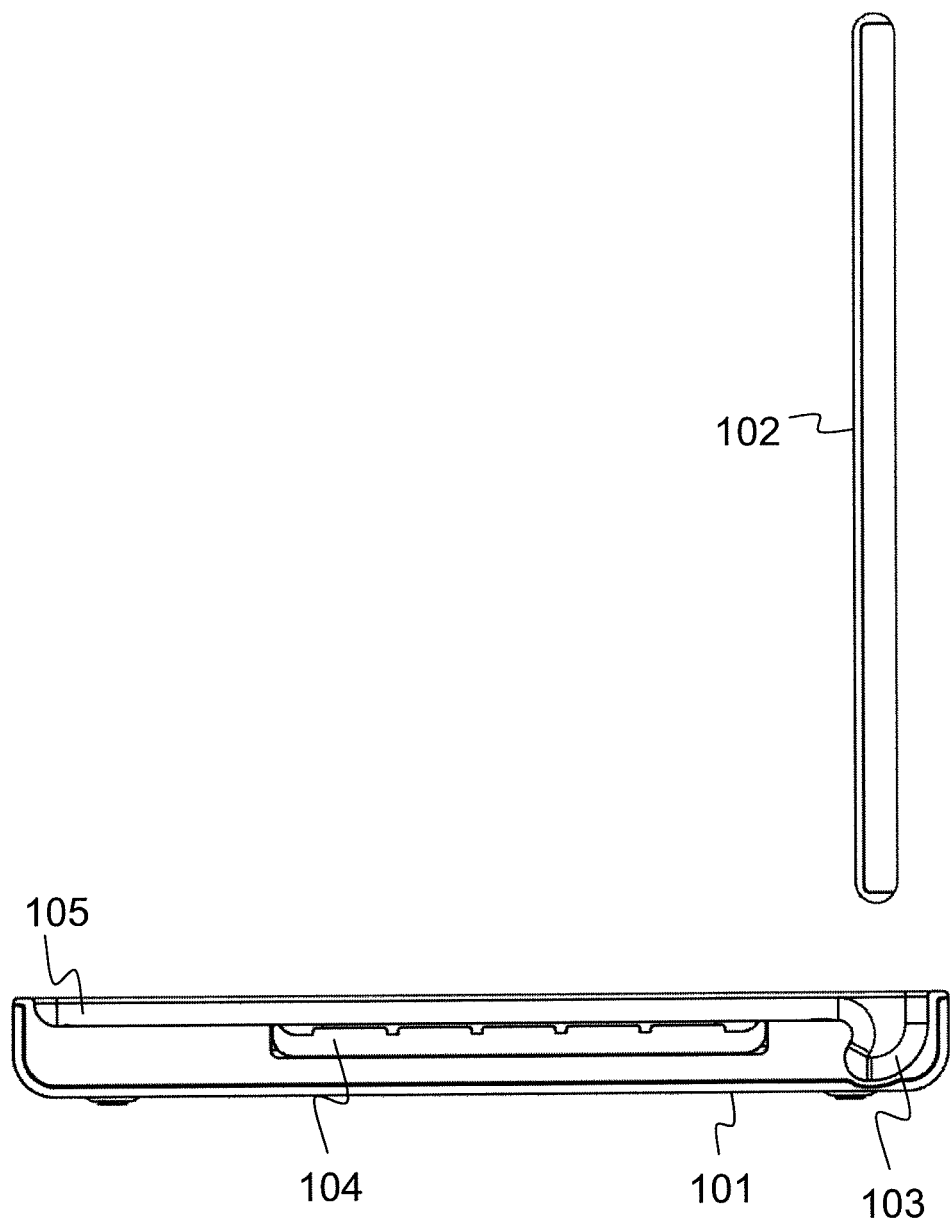

FIG. 4 shows the apparatus of FIG. 1 in a detached configuration. In the detached configuration the display part 102 is fully separated from the base part 101.

In an example embodiment the base part 101 communicates with the display part 102 over a low power radio frequency (LPRF) connection or a wifi connection or some other near field communication connection. The base part 101 may transmit/stream content to the display part and or execute realtime commands based on user input. In an example embodiment the display part continues to communicate with the base part over an LPRF or wifi connection irrespective of the configuration of the apparatus (e.g. when in closed configuration). In an example embodiment also other connectorless communication technologies can be used between the display part and the base part when in the closed configuration. For example, one can use optical data transmission, where a small window in the display part concealing an led transceiver sends/receives data to/from a similar setup in the base part. The two windows are configured to be aligned and in close proximity when the apparatus is in the closed configuration.

In an example embodiment, the display part 102 is fully detached for more diverse viewing of the display in comparison to the viewing angle provided in the open configuration shown in FIG. 3.

In an example embodiment, the display part 102 comprises an internal battery, which is used for powering up the display part when fully detached from the base part. In an example embodiment, the display part 102 always runs off its internal battery.

In an example embodiment there are some magnetic gold-plated connections between the base part and the display part to transfer power from a master (larger) battery in base part to an (smaller) display battery in the display part. The connection may exist in both open and closed configurations. The mating in such connections is a face to face connection, rather than a traditional male/female connection. The face to face connection is easily bypassed when the locking mechanism is released and the display pops open or when the display part is pulled from the cavity. Alternatively, an inductive zone discussed further below may be used for providing the charging functionality. The inductive zone solution can be made completely invisible to the user.

In an example embodiment there is a power management software that will ensure that the display battery is always recharged when the display part is in contact with the base part and let the user know when battery reserves of the display battery are dwindling.

In an embodiment the form of the recess 105 and the form of the cavity 103 are smoothly curved to allow for a clean interface at all times, whether the apparatus is in closed, intermediate, open or detached configuration.

Figure 5:
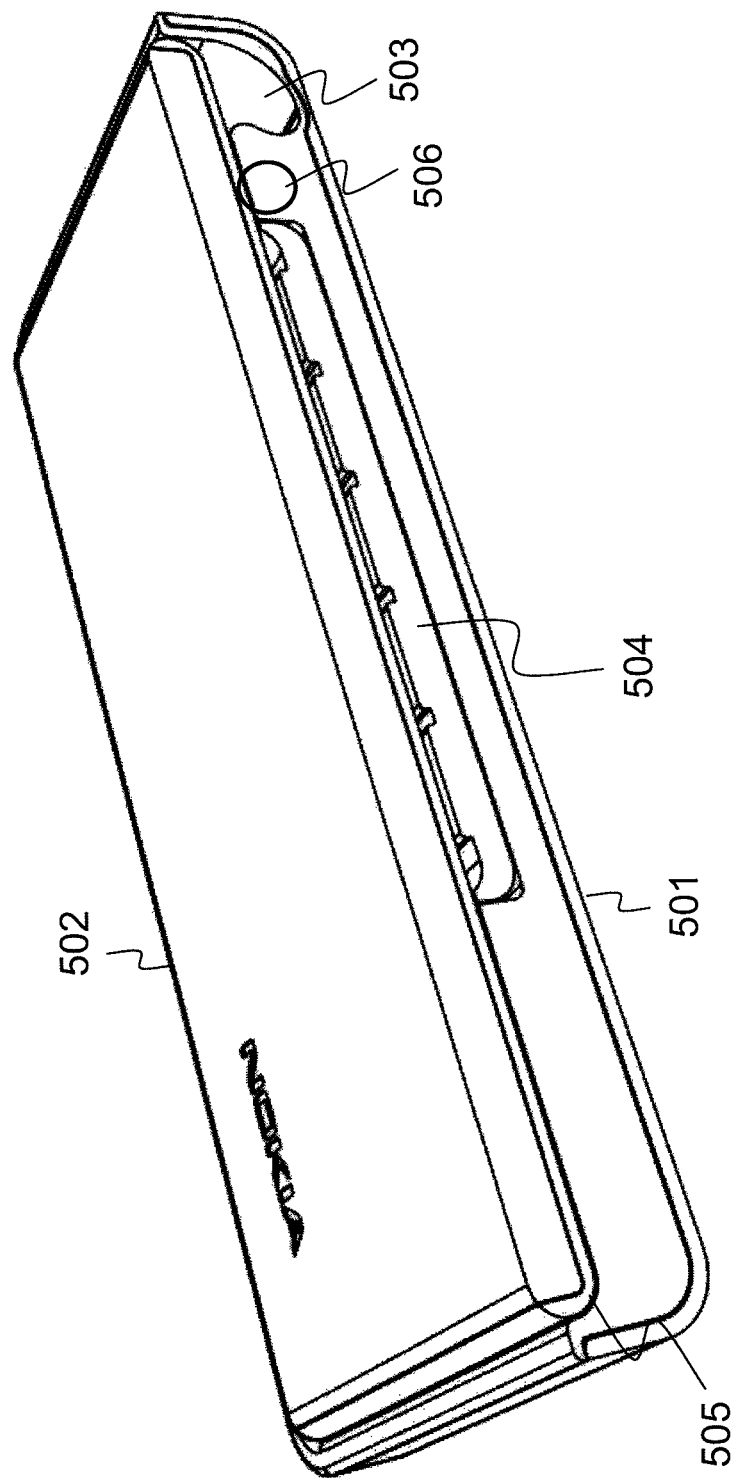
FIGS. 5-6 show a cross sectional view of an apparatus according to another embodiment of the invention.
Figure 6:
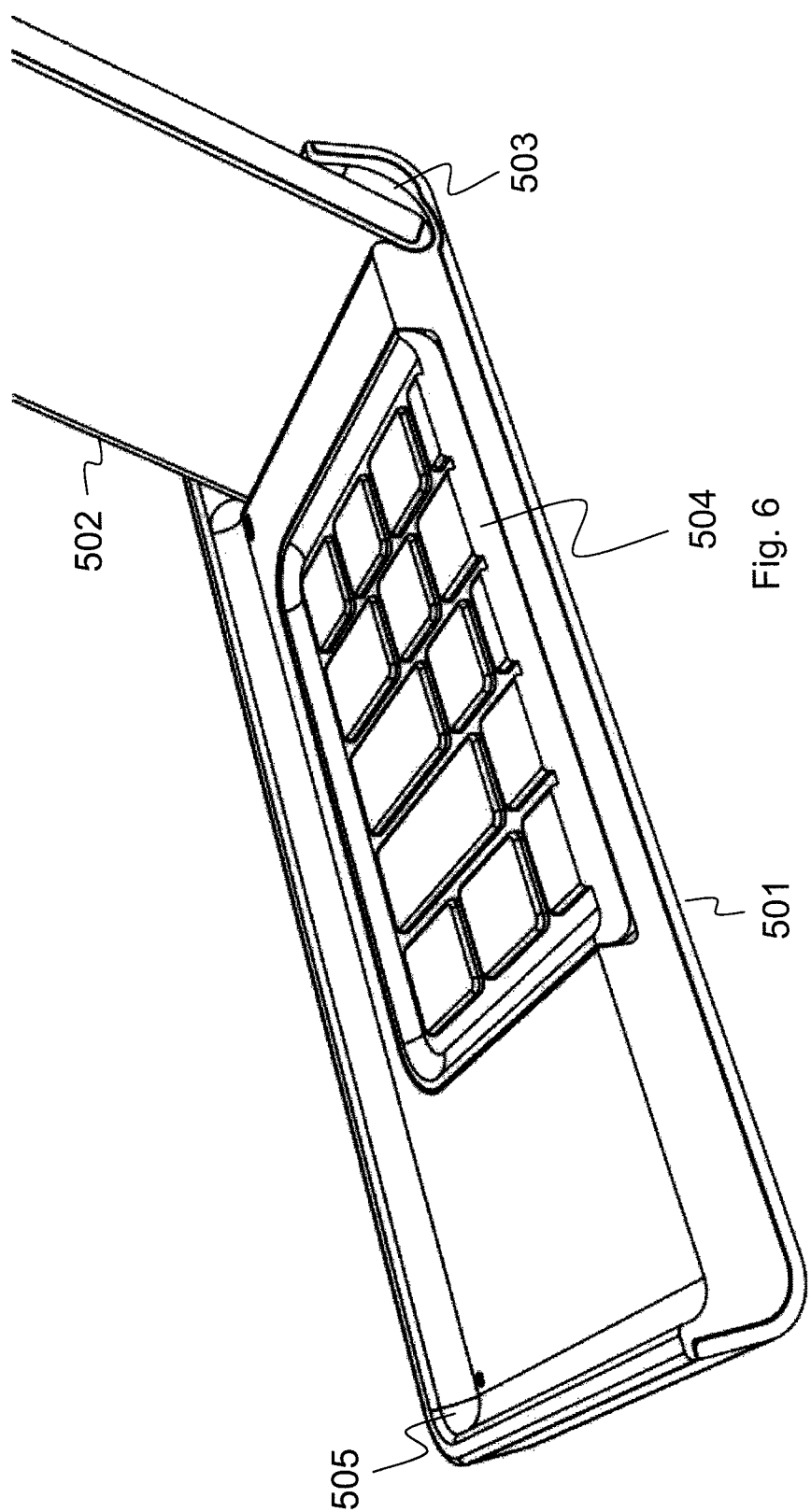

FIGS. 5-6 show a cross sectional view of an apparatus according to another embodiment of the invention.

FIG. 5 shows the apparatus in a closed configuration. The apparatus comprises a base part 501 and a display part 502.

The base part 501 comprises a longitudinal cavity 503, a keyboard 504 and a recess 505. The recess 505 is configured to receive the display part 502 such that in the closed configuration the display part 502 sits snugly in the recess 505.

In an example embodiment, the base part 501 comprises an inductive zone 506 near the cavity 503 in order to charge an internal battery of the display part 502. In an example embodiment, the inductive zone is arranged in a position that allows charging of the battery of the display part 502 whether the apparatus is in open, closed or intermediate configuration. In an example embodiment, the base part 501 comprises a master battery that can be plugged into mains power and the master battery is configured to charge the internal battery of the display part 502. This inductive zone charging functionality can be used as an alternative to simple face-to-face charging connections mentioned above.

FIG. 6 shows the apparatus of FIG. 5 in an open configuration. The cavity 503 holds the display part 502 in an upright tilted position in relation to the base part 501. The cavity 503 is formed such that it allows the display part 502 to be lifted up from the base part in order to fully detach the display part 502 from the base part 501.

FIG. 7 shows a partial cross sectional view of an apparatus according to an embodiment of the invention. The Figure shows an apparatus with a base part 101 and a display part 102 and an example implementation of a cavity 103 formed in the base part 101. The apparatus may be for example the apparatus of FIGS. 1-4.

The cavity 103 comprises a local detent 706. The detent 706 is one way to ensure the display part 102 is secured to the base part on at least two sides for stability. The detent 706 is configured to secure the display part 102 on one side and the (magnetic) locking mechanism discussed above secures the display part 102 on the other side. In the display part 102 there is a recess 707 that matches to the detent 706. The detent 706 and the recess 707 are configured to ensure that the display part 102 cannot be pulled directly upwards from the base part 101 on this side. The display part 102 can only be rolled around the detent 706 or slid out of the cavity 103. It must be noted that it is not mandatory to have the detent 706. Instead the (magnetic) locking mechanism may suffice for securing the display part against the base part.

In an alternative embodiment there is a rotary mechanical fixture instead of the local detent 706. Introducing in the cavity 103 or in proximity of the cavity 103 an additional fixed magnetic strip which applies a constant downwards force to hold the rolling edge of display part in place is still another option. Also some other structure may be used for providing the same functionality (controlling location/orientation of the display part in relation to the base part). The detent 706 (or one of the alternative structures) is configured to hold the display part 102 down when the apparatus is in the closed configuration. When the display part 102 has been detached from the base part 101 and is being placed back to the base part 101, the display part 102 is first placed to that end of the base part that comprises the cavity 103 and the local detent 706 holds the display part 102 down.

In an example embodiment a lower part of the cavity extends wider than opening part of the cavity 103 thereby forming an undercut geometry in the body of the base part 101. This provides a geometry that controls the upright orientation of the display with the help of gravity.

FIG. 8A shows an example block diagram of an apparatus 800 according to an embodiment of the invention. The apparatus is for example the electronic computing device of FIGS. 1-6.

The apparatus 800 comprises a base part 801 and a detachable display part 802.

The general structure of the base part 801 comprises a communication interface module 809, a processor 808 coupled to the communication interface module 809, and a memory 808 coupled to the processor 808. The apparatus further comprises software 807 stored in the memory 806 and operable to be loaded into and executed in the processor 808. The software 807 may comprise one or more software modules and can be in the form of a computer program product. The base part 801 further comprises a user interface controller 810 coupled to the processor 808 and a rechargeable battery 811 for powering up the apparatus 800.

The communication interface module 809 is configured to provide communications between the base part 801 and the display part 802 and with other external devices and systems, too. The communication interface module 809 may be, e.g., a radio interface module, such as a WLAN, Bluetooth, GSM/GPRS, CDMA, WCDMA, LTE (Long Term Evolution), LPRF, or wifi radio module. The communication interface module 809 may be integrated into the base part 801 or into an adapter, card or the like that may be inserted into a suitable slot or port of the base part 801. The communication interface module 809 may support one radio interface technology or a plurality of technologies. FIG. 8A shows one communication interface module 809, but the apparatus 800 may comprise a plurality of communication interface modules 809.

The processor 808 may be, e.g., a central processing unit (CPU), a microprocessor, a digital signal processor (DSP), a graphics processing unit, an application specific integrated circuit (ASIC), a field programmable gate array, a microcontroller or a combination of such elements. FIG. 8A shows one processor 808, but the apparatus 800 may comprise a plurality of processors.

The memory 806 may be for example a volatile or a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The base part 801 may comprise a plurality of memories. The memory 806 may be constructed as a part of the base part 801 or it may be inserted into a slot, port, or the like of the base part 801 by a user. The memory 806 may serve the sole purpose of storing data, or it may be constructed as a part of an apparatus serving other purposes, such as processing data.

The user interface controller 810 may comprise circuitry for receiving input from a user of the apparatus 800, e.g., via a keyboard, graphical user interface, speech recognition circuitry, or an accessory device, such as a headset, and for providing output to the user via, e.g., a graphical user interface or a loudspeaker. The user interface controller 810 is configured to control input and output through the display part 802, too.

The general structure of the display part 802 comprises a communication interface module 805, a display 803 and a rechargeable battery 804 for powering up the display part 802.

The communication interface module 805 is configured to provide communications between the base part 801 and the display part 802. The communication interface module 805 may be, e.g., a radio interface module, such as a WLAN, Bluetooth, GSM/GPRS, CDMA, WCDMA, LTE (Long Term Evolution), LPRF, or wifi radio module.

In the example of FIG. 8A the display part 802 can be seen as a simple touch display with battery and capabilities to receive/send data to the base part 801. The base part 801 includes the processing power and intelligence of the apparatus 800 with majority of antennae, memory, (larger) main battery, more demanding qwerty keyboard/user interface and other controls.

Figure 8B:
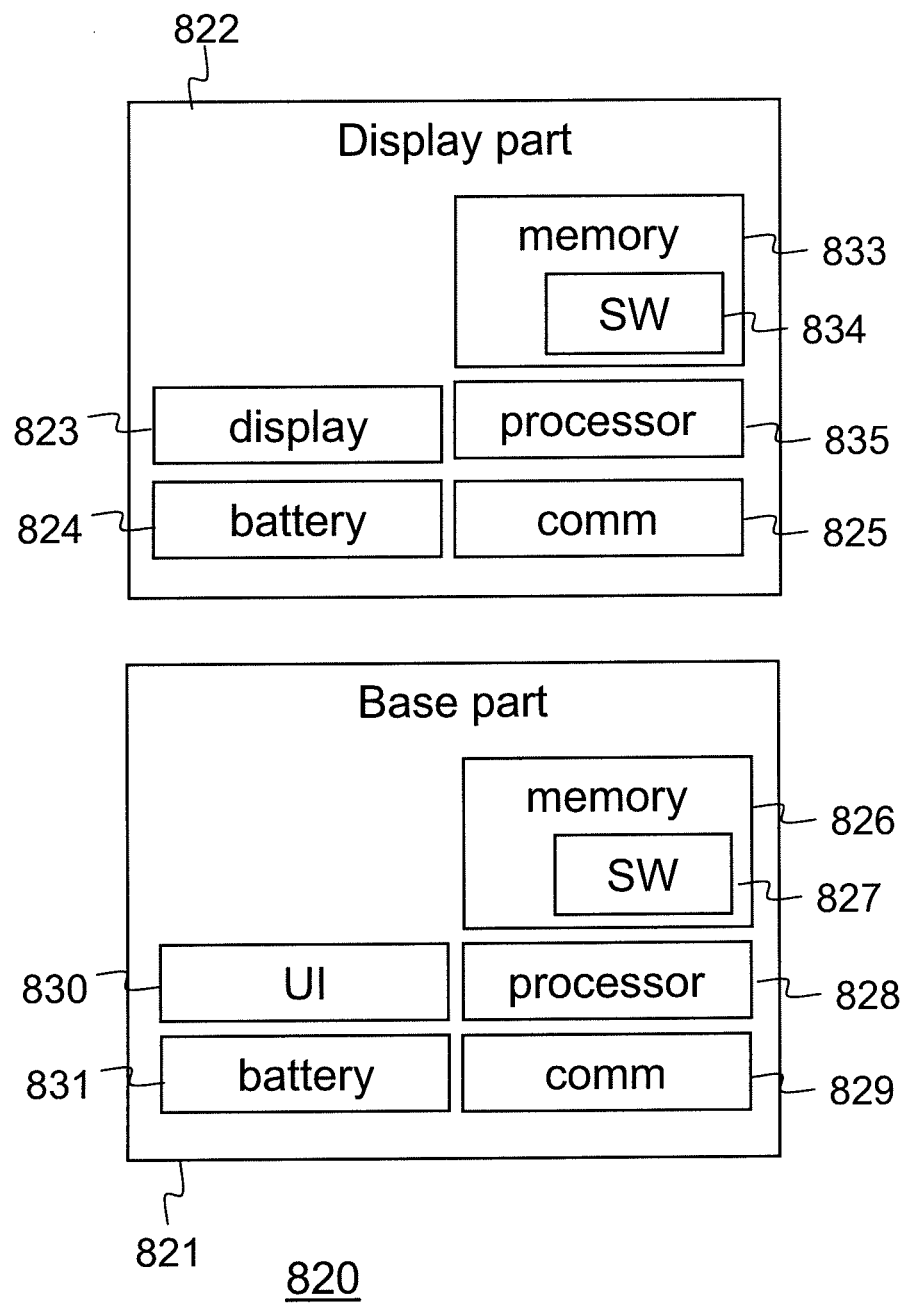
FIG. 8B shows an example block diagram of an apparatus according to an example embodiment of the invention.

FIG. 8B shows an example block diagram of an apparatus 820 according to an example embodiment of the invention. The apparatus is for example the electronic computing device of FIGS. 1-6.

The apparatus comprises a base part 821 and a detachable display part 822.

The general structure of the base part 821 comprises a communication interface module 829, a processor 828 coupled to the communication interface module 829, and a memory 828 coupled to the processor 828. The apparatus further comprises software 827 stored in the memory 826 and operable to be loaded into and executed in the processor 828. The software 827 may comprise one or more software modules and can be in the form of a computer program product. The base part 821 further comprises a user interface controller 830 coupled to the processor 808 and a rechargeable battery 831 for powering up the apparatus 820.

The communication interface module 829 is configured to provide communications between the base part 821 and the display part 822 and with other external devices and systems, too. The communication interface module 829 may be, e.g., a radio interface module, such as a WLAN, Bluetooth, GSM/GPRS, CDMA, WCDMA, LTE (Long Term Evolution), LPRF, or wifi radio module. The communication interface module 829 may be integrated into the base part 821 or into an adapter, card or the like that may be inserted into a suitable slot or port of the base part 821. The communication interface module 829 may support one radio interface technology or a plurality of technologies. FIG. 8B shows one communication interface module 829, but the apparatus 820 may comprise a plurality of communication interface modules 829.

The processor 828 may be, e.g., a central processing unit (CPU), a microprocessor, a digital signal processor (DSP), a graphics processing unit, an application specific integrated circuit (ASIC), a field programmable gate array, a microcontroller or a combination of such elements. FIG. 8B shows one processor 828, but the apparatus 820 may comprise a plurality of processors.

The memory 826 may be for example a volatile or a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The base part 821 may comprise a plurality of memories. The memory 826 may be constructed as a part of the base part 821 or it may be inserted into a slot, port, or the like of the base part 821 by a user. The memory 826 may serve the sole purpose of storing data, or it may be constructed as a part of an apparatus serving other purposes, such as processing data.

The user interface controller 830 may comprise circuitry for receiving input from a user of the apparatus 820, e.g., via a keyboard, graphical user interface, speech recognition circuitry, or an accessory device, such as a headset, and for providing output to the user via, e.g., a graphical user interface or a loudspeaker. The user interface controller 830 may be configured to control input and output through the display part 822, too.

The general structure of the display part 822 comprises a communication interface module 825, a processor 835 coupled to the communication interface module 825, and a memory 833 coupled to the processor 835. The display part 822 further comprises software 834 stored in the memory 833 and operable to be loaded into and executed in the processor 835. The software 834 may comprise one or more software modules and can be in the form of a computer program product. The display part 822 further comprises a display 823 and a rechargeable battery 824 for powering up the display part 822.

The communication interface module 825 is configured to provide communications between the base part 821 and the display part 822 and with other external devices and systems, too. The communication interface module 825 may be, e.g., a radio interface module, such as a WLAN, Bluetooth, GSM/GPRS, CDMA, WCDMA, LTE (Long Term Evolution), LPRF, or wifi radio module. The communication interface module 825 may be integrated into the display part 822 or into an adapter, card or the like that may be inserted into a suitable slot or port of the display part 822. The communication interface module 825 may support one radio interface technology or a plurality of technologies. FIG. 8B shows one communication interface module 825, but the apparatus 820 may comprise a plurality of communication interface modules 825.

The processor 835 may be, e.g., a central processing unit (CPU), a microprocessor, a digital signal processor (DSP), a graphics processing unit, an application specific integrated circuit (ASIC), a field programmable gate array, a microcontroller or a combination of such elements. FIG. 8B shows one processor 835, but the display part 820 may comprise a plurality of processors.

The memory 833 may be for example a volatile or a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The display part 822 may comprise a plurality of memories. The memory 833 may be constructed as a part of the display part 822 or it may be inserted into a slot, port, or the like of the display part 822 by a user. The memory 833 may serve the sole purpose of storing data, or it may be constructed as a part of an apparatus serving other purposes, such as processing data.

In the example of FIG. 8B also the display part 822 includes processing power and can be seen as a fully functional tablet device on its own. Whilst the base part 821 can be seen as an accessory, featuring extra battery, qwerty interface, and additional memory for example.

A skilled person appreciates that in addition to the elements shown in FIGS. 8A and 8B, the apparatuses 800 and 820 may comprise other elements, such as microphones, further displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 9:
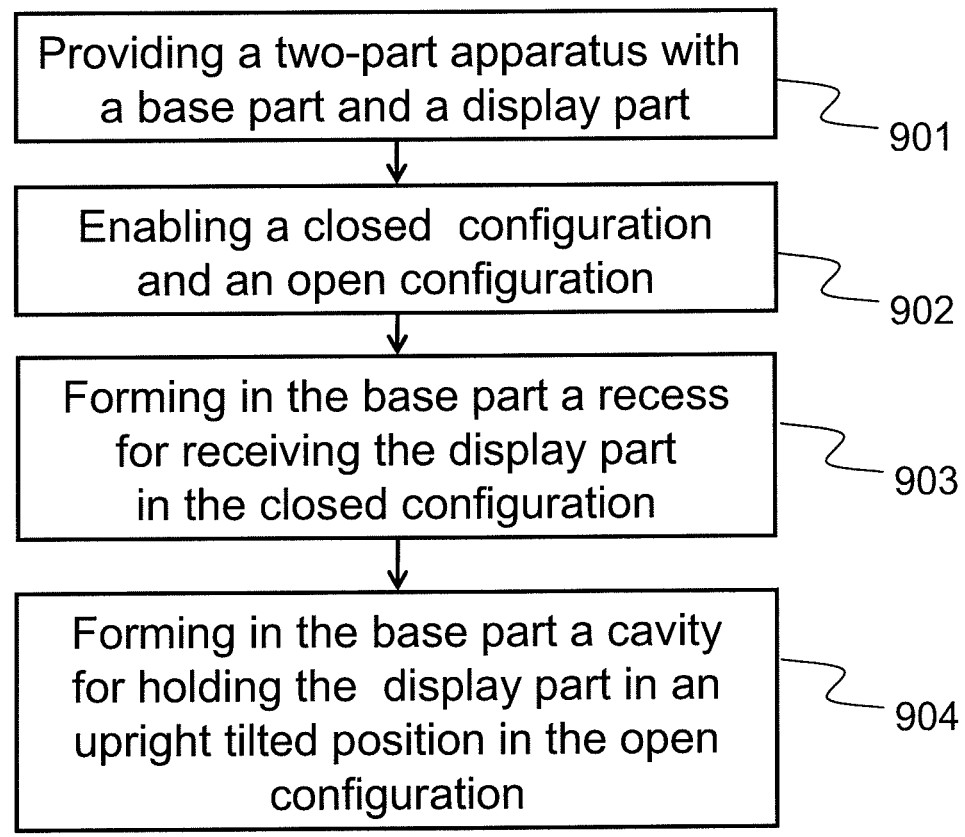
FIG. 9 shows a rough flow diagram showing a method in accordance with an example embodiment of the invention.

FIG. 9 shows a rough flow diagram showing a method in accordance with an example embodiment of the invention.

In phase 901, a two-part apparatus with a base part and a display part is provided. In phase 902, a closed configuration and an open configuration are enabled. Also intermediate and detached configurations may be enabled. In phase 903, a recess for receiving the display part in the closed configuration is formed in the base part. In phase 904, a cavity for holding the display part in an upright tilted position in the open configuration is formed in the base part.

Figure 10:
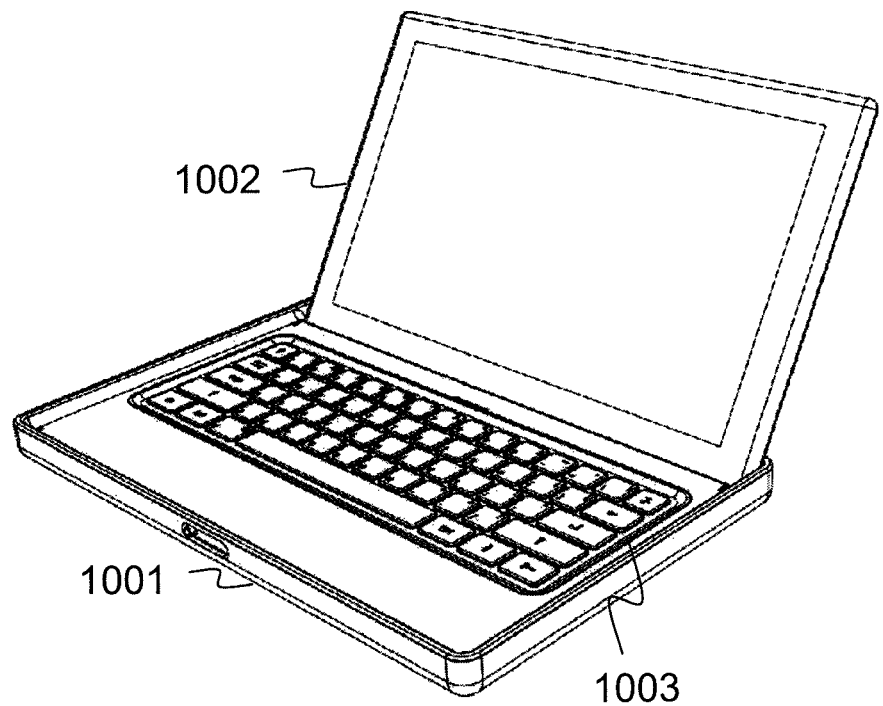
FIGS. 10-13 show apparatuses according to still further embodiments of the invention.

FIG. 10 shows an apparatus according to an embodiment of the invention in an open configuration. The apparatus comprises a base part 1001 and a display part 1002 and a mechanical keyboard 1003 in the base part.

Figure 11:
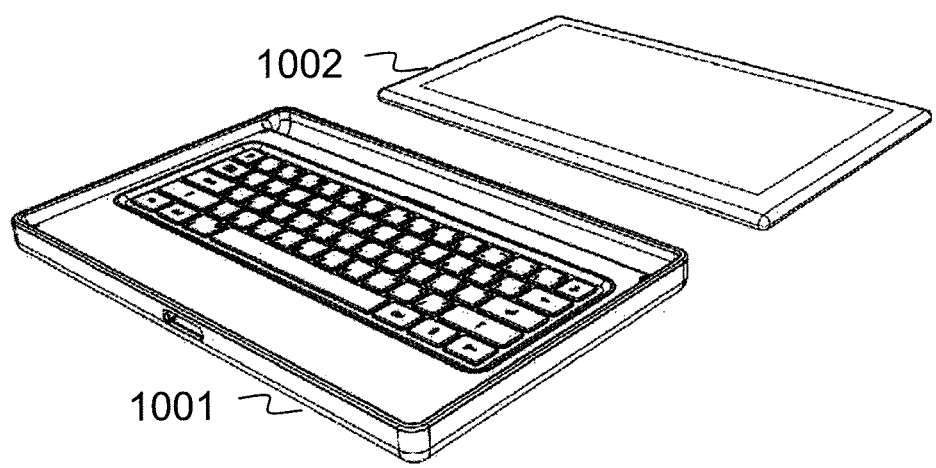

FIG. 11 shows the apparatus of FIG. 11 in a detached configuration.

Figure 12:
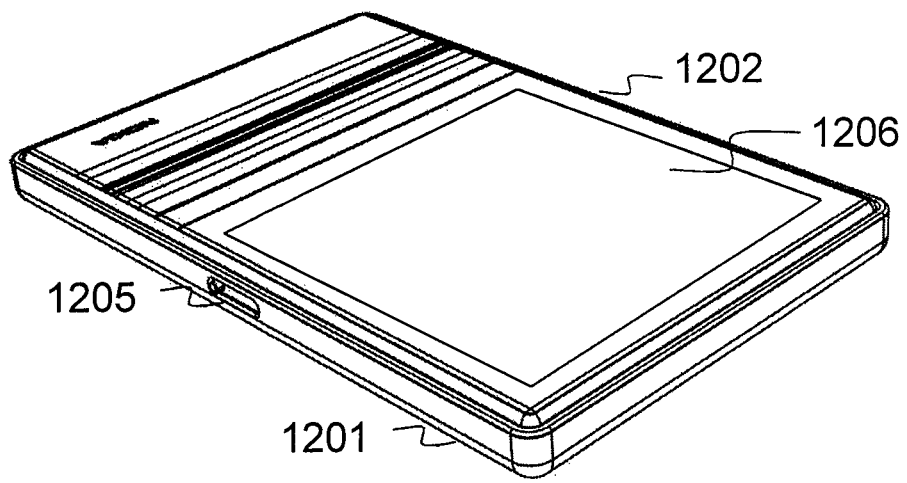

FIG. 12 shows an apparatus according to an embodiment of the invention in a closed configuration. The apparatus comprises a base part 1201 and a display part 1202, including a display 1206, and a latch 1205 of a locking mechanism on one side of the base part 1201.

Figure 13:
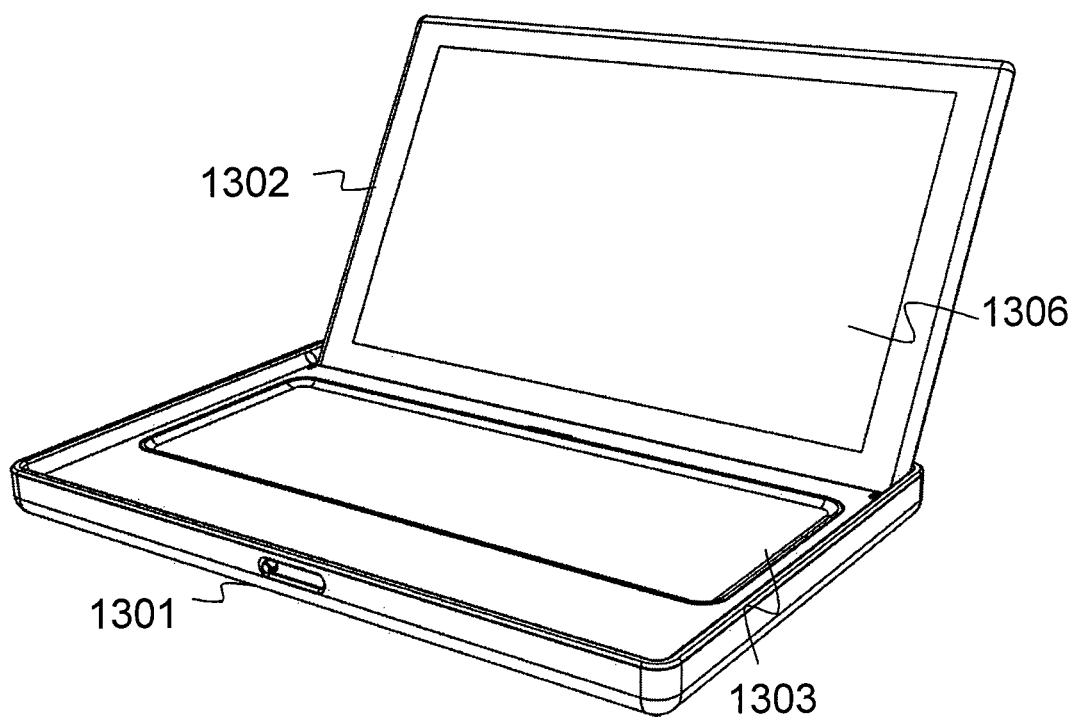

FIG. 13 shows an apparatus according to an embodiment of the invention in an open configuration. The apparatus comprises a base part 1301 and a display part 1302, including a display 1306, and a touch screen key mat or control panel 1303 in the base part.

Without in any way limiting the scope, interpretation, or application of the claims appearing below, certain technical effects of one or more of the example embodiments disclosed herein are listed in the following: A technical effect is versatile structure provided by different configurations. Another technical effect is simple detaching of the display part. Another technical effect is smooth movement of the display part from one configuration to another configuration.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

If desired, the different functions discussed herein may be performed in a different order and/or concurrently with each other. Furthermore, if desired, one or more of the above-described functions may be optional.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus, comprising:
    a base part,
    a display part, which is detachable from the base part, and
    a cavity formed in the base part, wherein the apparatus is configured to comprise at least a closed configuration and an open configuration, wherein
        in the closed configuration, the display part is configured to cover the base part and the cavity, and
        in the open configuration, the cavity is configured to receive and to alone hold the display part in an upright tilted position in relation to the base part, and wherein the cavity is curved to continuously guide movement of the display part with friction contact within the cavity as the display part moves from the closed configuration to the open configuration when the display part is raised from an edge of the display part opposite the cavity.

2. The apparatus of claim 1, wherein the apparatus is further configured to comprise an intermediate configuration, wherein a gap is formed between one edge of the display part and the base part.

3. The apparatus of claim 1, wherein the display part is movable and the cavity is configured to guide movement of the display part towards or away from the open configuration.

4. The apparatus of claim 1, wherein the apparatus is further configured to have a detached configuration, wherein the display part is detached from the base part.

5. The apparatus of claim 4, wherein in the detached configuration, the base part and the display part are configured to be operatively connected.

6. The apparatus of claim 4, wherein in the detached configuration, the base part is configured to control the display part.

7. The apparatus of claim 1, further comprising a locking mechanism configured to lock the display part to the base part when the apparatus is in closed configuration.

8. The apparatus of claim 7, wherein the display part is configured to move from the closed configuration to the intermediate configuration in response to release of the locking mechanism.

9. The apparatus of claim 7, wherein the locking mechanism is a magnetic locking mechanism.

10. The apparatus of claim 7, wherein the locking mechanism comprises a mechanical magnetic latch or a capacitive touch latch.

11. The apparatus of claim 1, wherein the base part comprises a recess configured to receive the display part in the closed configuration.

12. The apparatus of claim 1, wherein in the open configuration the cavity is configured to allow the display part to be detached from the base part.

13. The apparatus of claim 1, wherein in the open configuration the cavity is configured to allow the display part to be detached from the base part by lifting the display part up from the base part.

14. The apparatus of claim 1, wherein the apparatus comprises at least two operating modes in the closed configuration, wherein
    in a first operating mode, the apparatus is configured for transport, and
    in a second operating mode, the display part operates as a touch screen.

15. The apparatus of claim 1, wherein the display part comprises a display on one side of the display part.

16. The apparatus of claim 1, wherein the display part comprises a display on both sides of the display part.

17. The apparatus of claim 1, wherein the display part is reversible.

18. The apparatus of claim 1, wherein the base part and the display part are configured to communicate with each other over a wireless connection.

* * * * *